Dec. 5, 1939. F. D. JONAS Re. 21,287
FILING CONTAINER
Original Filed Nov. 5, 1931
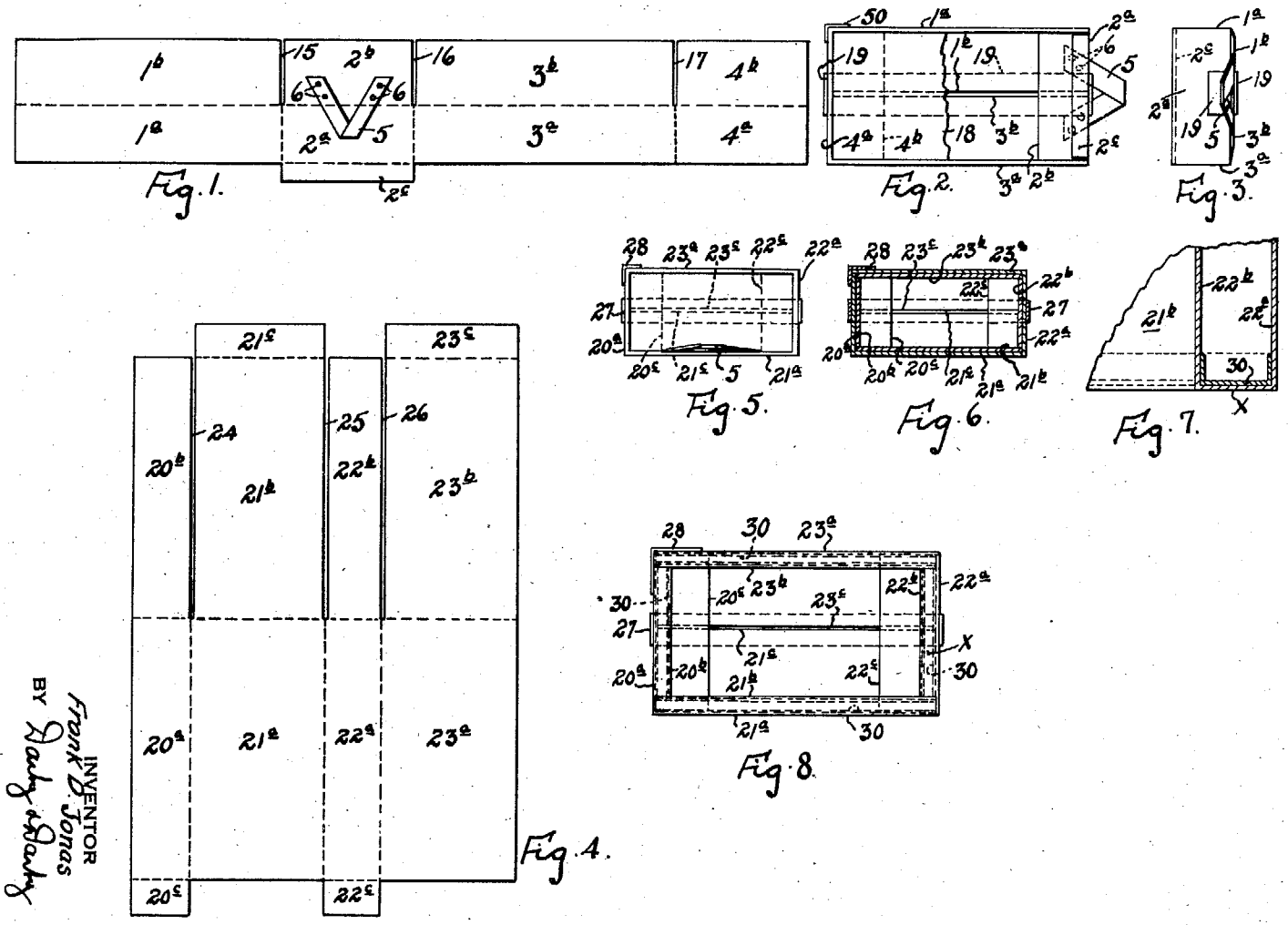
INVENTOR
Frank D. Jonas
BY Darby & Darby
ATTORNEYS.

Reissued Dec. 5, 1939

Re. 21,287

UNITED STATES PATENT OFFICE 21,287

FILING CONTAINER

Frank D. Jonas, East Williston, N. Y., assignor to Oxford Filing Supply Co., Brooklyn, N. Y., a partnership comprising Richard A. Jonas, Richard A. Jonas, Jr., Robert P. Jonas, Frank D. Jonas, and Edward F. Jonas Original No. 1,944,328, dated January 23, 1934, Serial No. 573,096, November 5, 1931. Application for reissue July 17, 1934, Serial No. 735,714

1 Claim. (Cl. 229—37)

This invention relates in general to filing containers of the sliding drawer type made from cardboard fibre and other similar materials and are designed for shipping flat or "knocked down" for setting up by the user.

The general object of the invention is to provide a relatively cheap filing or storage container of this type which is adapted to rapid manufacture in large quantities and which is exceedingly rugged in construction and well adapted to stand the rigors which such storage containers are subjected to.

This invention involves many other objects which will appear from the detailed disclosure given below.

This invention resides substantially in the combination, construction, arrangement and relative location of parts all as will be described in detail in the following specification.

Referring to the drawing:

Figure 1 is a developed view of the sheet of material from which the drawer of the container is constructed;

Fig. 2 is a top plan view of the finished drawer with the re-enforcing bottom member partially broken away;

Fig. 3 is an end elevational view of the drawer;

Fig. 4 is a developed view of the material from which the drawer cabinet is formed;

Fig. 5 is an end elevational view of the complete structure showing the cabinet with the drawer therein;

Fig. 6 is a vertical central cross-sectional view through the cabinet with the drawer removed;

Fig. 7 is an enlarged cross-sectional detailed view of a modified construction.

There are at the present a number of filing or storage containers of the general nature of this invention. Such containers, however, have various weaknesses or defects which, for one reason or another, impair their efficiency in normal use. For this reason the present invention has been devised with the particular object in mind of constructing an exceedingly strong container of this type by reason of the peculiarities of construction employed. The container of this invention is preferably made of cardboard such as the corrugated type, of fibre and other similar materials. By reason of the ruggedness of the container of this invention it is possible to support a number of the containers, one on top of the other, even when loaded to form substantially a filing cabinet of what might be termed the built-up type. These containers are largely used for the storage of non-current records and are stacked in piles of considerable height, necessitating a file of great strength to sustain the load. There are at present filing or storage containers of the general nature of this invention, but such containers have several defects and weaknesses which impair their efficiency in normal use. The side walls tend to buckle under load at the front opening when the drawer is withdrawn. Metal fasteners and handles must be pierced for and attached by the user entailing considerable time for erection, and there are many raw cut edges exposed giving the container a crude, unfinished appearance. The container of this invention, by reason of the peculiarities of construction employed, is generally more rugged and substantial, is greatly strengthened against buckling of the side walls at the front opening, can be set-up very quickly as there are no handles or metallic pins or fasteners to attach, and has a minimum of raw cut edges exposed thus presenting a more finished, pleasing appearance.

Referring to the drawing in detail there is shown in Fig. 1 a single piece of material from which the drawer is substantially formed. It may be cut out or built up from stock in accordance with the principles long known in this art. As indicated it comprises in one piece the sections $1^a$, $1^b$, $2^a$, $2^b$, $3^a$, $3^b$, and $4^a$, $4^b$. The sections $1^b$, $2^b$, $3^b$ and $4^b$ are severed from each other by means of a slot or cut as indicated at 15, 16 and 17. These same portions which are thus formed are foldable along the dotted lines indicated. The portion $2^a$ is provided with an integral flap $2^c$ which is likewise bendable along the dotted line shown. Attached to the portion $2^b$ is a suitable handle 5 which is illustrated in the drawing as a band or strap, of suitable material such as heavy woven fabric, metal or fibre, secured thereto by means of rivets 6. The handle is of such a design as to permit the gummed strap 19 to pass through and be affixed to portion $2^a$ as shown. The drawer is formed by folding the blank of material along the vertical dotted lines of Fig. 1 to form right angles. The result is a rectangular form which may be secured in this shape at the abutting edges of portions $1^a$ and $1^b$ by means of a gummed strap 50. The portions $2^b$ and $4^b$ are then folded into right angle position with respect to the portions $1^a$ and $4^a$ respectively, as indicated in Fig. 2, and the portions $1^b$ and $3^b$ are then folded thereover as is indicated in Fig. 2. A strap of gummed material 19 is then fastened over the joint formed at the bottom of the container as clearly indicated in Fig. 2 and is brought up some distance on sides $2^a$ and $4^a$. It is, of course, apparent that the opposed edges of the portions $1^b$ and $3^b$ of Fig. 2 may be substantially in contact or separated a short distance as indicated in Fig. 2. A rectangular piece of material is then forced down into the container to form a smooth interior bottom wall therefor. The strap or handle 5 projects out of one end of the container as indicated in Figs. 2 and 3 and the ends which are attached to the portions $2^b$ by the rivets 6 lie between the portions $2^b$ and the portions $1^b$ and $3^b$ as clearly shown in Fig. 2. The portion $2^c$ is then folded over at right angles to form a finished edge and a wall under which the papers in the container lie especially when it is full to prevent the papers from interfering with the drawer action. This portion or flap $2^c$ also fits down between the side walls of the drawer to strengthen the drawer against lateral pressures as does the tight-fitting inlaid bottom portion $18^a$. The portions $2^b$ and $4^b$ likewise fold up into a position so as to lie between the side pieces $1^a$ and $3^a$ so as to act in conjunction with the flap $2^c$ to laterally strengthen the drawer. As a result of this construction, which is exceedingly simple, a very rugged and strong drawer is obtained.

The case for the drawer is shown in Figs. 4, 5 and 6. It comprises a single piece of material comprising the portions $20^a$, $21^a$, $22^a$, $23^a$, $20^b$, $21^b$, $22^b$, $23^b$, $20^c$, $22^c$, $21^c$, and $23^c$. All of these portions are integral to form a single piece which is foldable upon the dotted lines to form the container. The portions $20^b$, $21^b$, $22^b$ and $23^b$ are separated longitudinally by the slots or cuts 24, 25 and 26. The main body portion is bent on the dotted line so as to form a rectangular enclosure having the sides $20^a$ and $22^a$ and the top and bottom $23^a$ and $21^a$. The abutting edges are sealed together by means of the gummed strip 28. The walls of the container are given a double thickness by bending the flaps $20^b$, $21^b$, $22^b$ and $23^b$ on the dotted lines into the container so as to lie flat against and parallel with the inside surfaces of the walls $20^a$, $21^a$, $22^a$ and $23^a$ respectively. These long flaps can be folded in position by scoring them at suitable points as is well known in this art. The upper and lower flaps ($21^b$ and $23^b$) when turned in are a close fit between the sides ($20^a$ and $22^a$) while the side flaps ($22^b$ and $20^b$) when turned in fit closely between the turned in flaps $21^b$ and $23^b$ thereby forming walls of double thickness with the side walls taking the load of the double thickness top. Turning in the flaps provides not only smooth edges as indicated in Fig. 5 but the fold immeasurably strengthens the front opening through the greater resistance to distortion which a fold provides. The result is that at the front of the container it is provided with smooth edges as indicated in Fig. 5. By folding back the flaps onto the portion to which they are attached the container is not only given walls of double thickness, as is clear from Fig. 6 which is the section through the case, but the fold itself at the front opening has the property of resisting buckling, bowing, or sagging. The flaps $20^c$ and $22^c$ are then bent into a right angle position as is clear from Fig. 6. The flaps $21^c$ and $23^c$ are then folded in at right angles to overlie the flaps $20^c$ and $22^c$ as is likewise clear in Fig. 6. Over the joint thus formed and extending part way down the sides is secured the gummed strip 27. This provides the container which receives the drawer as is clear in Fig. 5. It is at once apparent that the rigidity and strength imparted by the construction employed provides an outer case or shell which is exceedingly strong and well adapted to support without crushing not only the weight of the contents thereof but a number of similarly loaded files one upon the other even though the drawers are either partially or completely withdrawn. They are also enabled by means of this construction to endure the relatively rough treatment to which they would be normally subjected.

The principle of increasing the strength and rigidity of the outer container is carried further in a slightly different form in Fig. 7. The front edges of the container are expanded into a wall of the desired width as indicated at X with the side wall $22^a$ and the flap portion $22^b$ lying parallel as indicated. This construction may be re-enforced by insertion of wood, metal or fibre member of a suitable form like the U-shaped girder 30 which fits on the interior thereof and may be, if desired, glued or otherwise secured thereto. This construction gives even greater rigidity to the outer container although it tends to enlarge its overall dimensions somewhat. The principle of construction, however, is the same in both forms of structure.

It should also be noted that by the construction employed in attaching the handle in the manner illustrated the strains which are transmitted through the handle are evenly distributed throughout the drawer structure and because the handle acts in a plane parallel to the flap $22^b$ in the bottom of the drawer the result is an exceedingly strong structure.

Another modification which may be employed in strengthening the casing of this invention consists in providing a metal re-enforcing band which fits entirely around the casing adjacent the open end or mouth thereof and lying between the double walls so as to be entirely covered over. Such a re-enforcing strip acts to aid in maintaining the casing in correct form when the drawer is removed therefrom and prevents buckling and bowing even if a number of loaded containers are resting thereon and the drawer is removed therefrom.

From the foregoing description it will be apparent that my invention resides in certain principles of construction which may be embodied in other physical forms without departure therefrom. I do not, therefore, desire to be strictly limited to the disclosure as given for purposes of illustration but rather to the scope of the appended claim.

What I seek to secure by United States Letters Patent is:

A file case as described, comprising a shell of fibre board, said shell having top, bottom, rear, and side walls united to form an open-ended shell having its open end lying in a vertical plane, extensions on the top, bottom and side walls folded into the shell to form reenforcements for the open end thereof, the folded extensions of the side walls lying between the folded extensions of the top and bottom walls and being of sufficient thickness to lock them in place.

FRANK D. JONAS.